United States Patent
Ardalan (10) Patent No.: US 11,323,181 B2
(45) Date of Patent: May 3, 2022

(54) PHASE OPTIMIZATION TECHNIQUE IN HIGH-SPEED SIMULTANEOUS BIDIRECTIONAL LINKS

(71) Applicant: Radin Global, San Jose, CA (US)

(72) Inventor: Shahab Ardalan, San Jose, CA (US)

(73) Assignee: Radin Global, San Jose, CA (US)

( * ) Notice: Subject to any disclaimer, the term of this patent is extended or adjusted under 35 U.S.C. 154(b) by 458 days.

(21) Appl. No.: 16/460,074

(22) Filed: Jul. 2, 2019

(65) Prior Publication Data

US 2019/0326994 A1 Oct. 24, 2019

Related U.S. Application Data

(63) Continuation-in-part of application No. 15/286,538, filed on Oct. 5, 2016, now Pat. No. 10,361,786.

(51) Int. Cl.
*H04B 10/43* (2013.01)
*H04B 10/2507* (2013.01)
*H04B 10/25* (2013.01)

(52) U.S. Cl.
CPC ......... *H04B 10/43* (2013.01); *H04B 10/2503* (2013.01); *H04B 10/2507* (2013.01)

(58) Field of Classification Search
CPC . H04B 10/43; H04B 10/2503; H04B 10/2507
See application file for complete search history.

(56) References Cited

U.S. PATENT DOCUMENTS

| | | | |
|---|---|---|---|
| 8,933,743 B1* | 1/2015 | Farmer | H03K 5/151 327/270 |
| 2004/0120391 A1* | 6/2004 | Lin | H04L 5/1423 375/219 |
| 2006/0133599 A1* | 6/2006 | Pagnanelli | H04B 1/525 379/406.08 |

* cited by examiner

*Primary Examiner* — Mina M Shalaby
(74) *Attorney, Agent, or Firm* — Platinum Intellectual Property LLP (57) ABSTRACT

A bidirectional transceiver includes a transmitter and a receiver that respectively transmits a local signal to and receives remote signal from a common bidirectional communication channel, thus the bidirectional channel signal is the superimposition of the local and remote signals. The bidirectional transceiver also includes a transmit canceller that substantially removes the local transmitted signal from the superimposed signals on the bidirectional channel before the local receiver. The remote signal is transmitted by a remote transceiver over the bidirectional channel. A sampling phase is set, based on timing information in the received remote signal, and the received signal is sampled. Timing relation of transitions in the local transmit signal relative to the receiver sampling phase is set such that transmit signal cancellation is optimum at receiver sampling phase, by changing the delay applied to the local transmit signal. To keep the timing relation of the local transmit signal relative to the remote transceiver, a second delay is applied to the local transmit signal before transmission into the bidirectional channel that provides a delay substantially same as the first delay but opposite in direction.

12 Claims, 8 Drawing Sheets

PHASE OPTIMIZATION TECHNIQUE IN HIGH-SPEED SIMULTANEOUS BIDIRECTIONAL LINKS

CROSS-REFERENCE TO RELATED APPLICATIONS

This application is a continuation in part of U.S. patent application Ser. No. 15/286,538, filed Oct. 5, 2015 titled "Phase Optimization Technique in High-Speed Simultaneous Bidirectional Links", which claims benefit priority to U.S. Provisional Patent Application Ser. No. 62/238,109, filed on Oct. 6, 2015 titled "A Receive Sampling Phase Optimization Technique in Multi-Gbps Bi-Directional Serial Links", the entire contents of each such application are incorporated by reference herein.

TECHNICAL FIELD

The present disclosure relates generally to the field of communication, and specifically to high-speed simultaneous bi-directional serial links

BACKGROUND

One technique for simultaneous bi-directional data transmission is separate communication channels. This can be inefficient, though, as available channel capacity in the opposite direction can be unused. Such inefficiency can be costly, particularly where bandwidth is limited (e.g., wireless communication), the transmission distance is long (e.g., long-haul fiber optic communications), or the number of available channels is limited or costly (e.g., high-throughput integrated circuit packages and printed circuit boards (PCBs).

Another technique for simultaneous bi-directional communication is to assign different carrier frequencies for signals traveling in opposite directions. The near-side transmit signal can be modulated by one carrier frequency, and the received signal from the far-side is modulated by another carrier frequency. The difference between the carrier frequencies can be enough so the transmit and receive spectrums do not overlap and can be properly filtered out at each receiver. This method can be inefficient because it splits the effective available channel bandwidth between the two directions, which can be disadvantageous in high-throughput applications. Additionally, the required frequency separation margin, for proper channel isolation and filtering of signals in each band, can lead to wasteful use of the channel bandwidth. For example, operation of a simultaneous bi-directional communication using separate frequency channels in each direction can waste half or more of the total available channel bandwidth.

Another technique for simultaneous bi-directional transmission operates transceivers at opposite ends of a channel medium, concurrently transmitting signals to one another other, through the channel medium, such that the receiver of each transceiver receives a superposition of the signal sent by the opposite end transceiver, and the signal transmitted by its own transmitter. One technique for removing the signal transmitted by its own transmitter is to generate, locally, a replica of that transmitted signal and then subtract the replica from the superposition, then sample the residual. If the replica is exact, the only signal remaining in the residual is the signal from the opposite end transceiver. However, there can be problems with this technique, particularly at higher communication bandwidths. Certain of the problems can arise from fast slew rate transitions of the transceiver's own transmitted signal, as these can introduce noise, especially if proximal in time to a trigger or sampling phase of the receiver's sampler. However, conventional techniques cannot simply shift the sampling phase to move it away from transitions in the locally transmitted signal, because the sampling phase is optimized in relation to the symbol period in the received signal. Merely shifting the sampling phase could result in sub-optimal sampling, which in turn could produce unacceptably high error rates.

There is a need therefore for a practical, stable performance simultaneous bi-directional transceiver system in which opposite end transceivers can each cancel receipt of their own transmissions, while maintaining in the each of the transceivers an optimal sampling of the signal received from the other.

DETAILED DESCRIPTION

Figure 1:
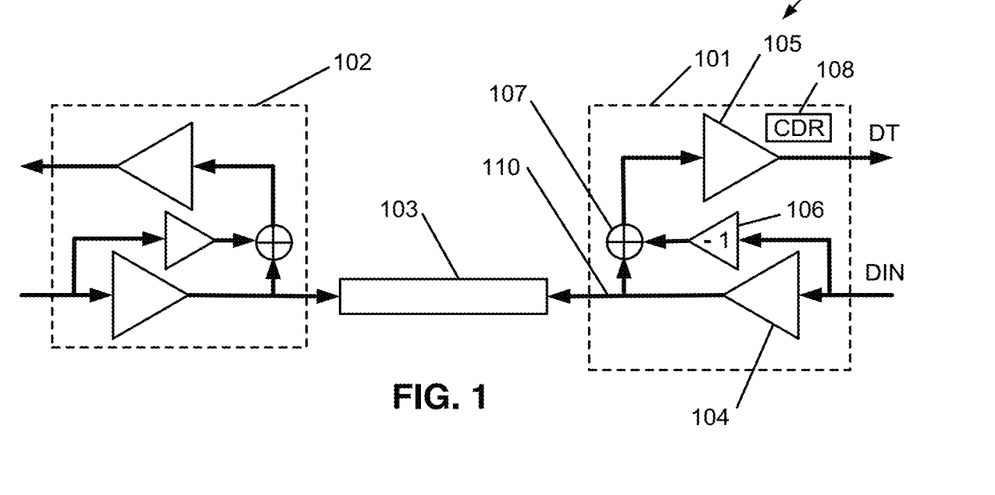
FIG. 1 Illustrates one example bidirectional communication link over a single physical channel.

FIG. 1 illustrates an example simultaneous bi-directional transceiver system capable of providing recovery, at each of the bi-directional transceivers 101 and 102, of the signal transmitted through the physical channel 103 by the other. Transceiver 101 includes transmitter 104, receiver 105, transmit replica unit 106, signal adder 107, and a clock and data recovery (CDR) unit 108. Transceiver 102 is similarly configured, and therefore labeling is omitted. Operation will be described for the transceiver 101, and will be understood to apply in like manner to transceiver 102. In operation, the line signal at the bi-directional transceiver 101 is a superposition of the transmit signal output by its own transmitter 104 and a signal received, after travelling through the channel 103, from the transmitter of transceiver 102. The transceiver 101 removes its own transmit signal from the superposition by configuring the transmit replica unit 106 to generate substantially the same signal as transmitter 104 but with opposite polarity, then using signal adder 107 to add the opposite polarity replica signal and the channel signal and outputs the sum as a residual to the receiver 105. Operations of the CDR unit 108 will be described in greater detail in reference to FIGS. 2A and 2B. Referring to FIG. 1, assuming the transmit replica unit 106 generates an accurate replica (with opposite polarity), the residual will include none of the signal transmitted by transmitter 104. However, as the communication signal bandwidth increases, certain phenomena can arise, including significant attenuation by the physical channel 103 of the signal from the opposite end transceiver, that can complicate, or degrade, or both, the above-described transmit signal cancellation.

Figure 2A:
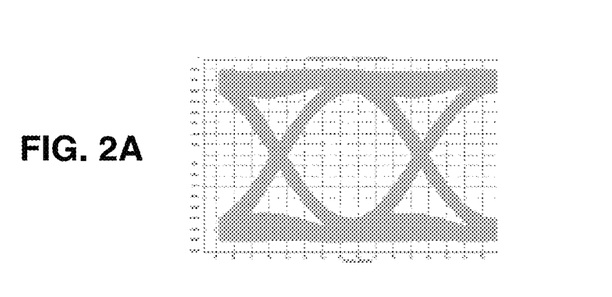
FIG. 2A Illustrates a transmitter eye diagram for a non-return to zero (NRZ) data pattern before the physical channel.
Figure 2B:
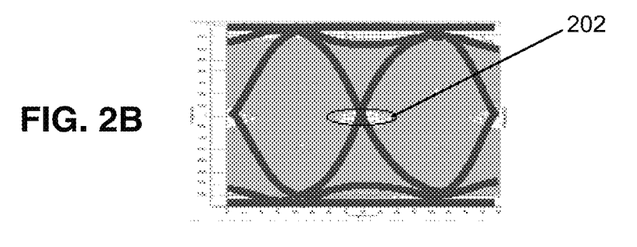
FIG. 2B Illustrates an attenuated received eye diagram after a low-pass channel, with the strong local transmit signal transitioning at middle of received eye opening.

Referring to FIGS. 2A and 2B, information represented by the drawings will be described referring to FIG. 1, and will assign transceiver 101 as a "local" transceiver and transceiver 102 as a "remote" transceiver. Referring to FIG. 2A, illustrated is a transmit signal eye diagram at the remote transceiver (e.g., at transceiver 102) before the channel 103. FIG. 2B shows the attenuated received signal, as received at the local transceiver (e.g., transceiver 101) after passing through the channel 103. At the local transceiver, the CDR unit 108 determines optimum sampling phase. A conventional CDR unit extracts the phase and frequency information from the received signal and generates a local clock that is frequency locked to the received signal with a sampling phase for highest received SNR. In a high-speed simultaneous bidirectional link, the received signal eye opening is significantly smaller compared to the local transmit amplitude on the same channel. Thus, small residual errors in cancellation of the relatively large transmit signal leads to large degradations of the received signal. Large transmit cancellation errors specifically occur during the fast signal transitions, as any minor timing error such as phase error or jitter translates to large amplitude errors. FIG. 2B shows an example of a highly attenuated received signal with a large local transmit signal transition at middle of the received eye opening. This condition represents a worst case scenario for this problem, because transmit maximum slew rate occurs at the same phase location as CDR unit chooses as optimum receive sampling point. Therefore a conventional CDR functionality cannot provide an optimum sampling condition for receive SNR.

Figure 2C:
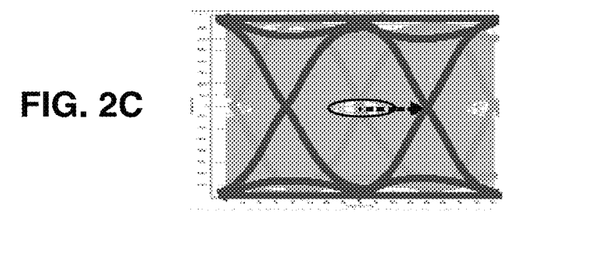
FIG. 2C Illustrates an attenuated received eye diagram after a low-pass channel, with local transmit transition timing shifted away from the received eye opening.

Referring to FIG. 1 simultaneous bidirectional link 100, there are two signals whose phase alignments are important, the conventional CDR and conventional circuit combinations arrangement circuit provide only one degree of freedom in phase selection. As will be appreciated and understood from reading this disclosure, implementations and aspects of disclosed methods and systems can provide two degrees of freedom. One is the control of timing between sampling clock phase and received signal. The second is shifting the transmit transitions of the local transmitted signal away from the received signal optimum sampling time selected by the CDR. This condition is shown in FIG. 2C, where the earlier transmit transitions (occurring at middle of the receive eye) are shifted by half a symbol time to have the maximum distance from the received center eye. In an aspect, the additional timing control can be configured to shift the fastest transmit slew rate region (around transmit zero crossings) in between two consecutive optimum receive sampling points. Such relative phase adjustment, as shown in FIG. 2C, can align the lowest slew rate portion of the transmit signal with the receiver optimum sampling point, thus minimizes the transmit cancellation error.

Figure 3A:
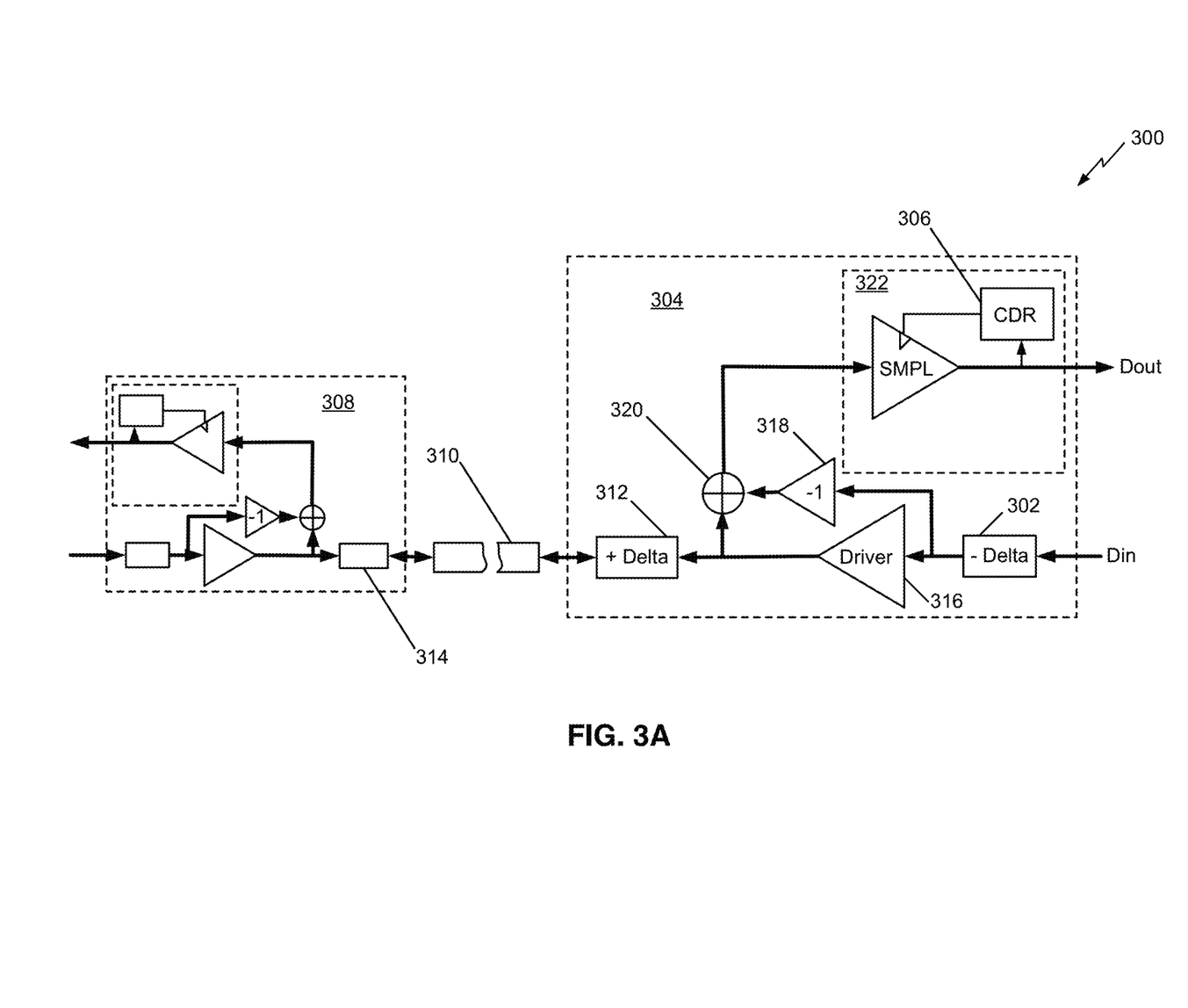
FIG. 3A Illustrates an example implementation of a phase optimizing simultaneous bidirectional link according to various aspects.

FIG. 3A shows an implementation of an example simultaneous bidirectional link 300 according to various aspects. Referring to FIG. 3A a delay unit 302, which will be referred to as a "relative delay" unit 302 is arranged in a first bidirectional transceiver 304 that, when controlled as will be described, sets the relative delay between the local transmit transitions and the optimal receiver sampling phase. By providing this new degree of freedom between the local transmit and receive timing, the relative delay unit 302 can shift local transmit transitions away from optimal receiver sampling phase as determined by a timing or clock recovery unit 306. Referring to FIG. 3A, there can be a second or remote bidirectional transceiver 308 on the other side of the bidirectional channel 310. In an implementation, as illustrated in FIG. 3A, the configuration and components of the remote bidirectional transceiver 308 may be identical to or substantially the same as those of the first bidirectional transceiver.

Accordingly, to avoid obscuring relevant details in FIG. 3A, explicit labeling and numbering of items in the remote bidirectional transceiver 308 is omitted. In some embodiments, each of the items is implicitly numbered and labeled identical to the corresponding item of the first bidirectional transceiver 304.

Another application of the bidirectional delay line 312 is to provide a means for removing the differential skew in the positive and negative polarities of the received signal. As a differential signal travels through a channel, the positive and negative polarities of the signal experience different delays as they travel through separate paths. Such delay difference is not noticeable at lower data rates, because it is a small percentage of the each data symbol. However, such delay difference becomes a larger portion of a data symbol at very high data rates and will affect signal quality at the receiver severely. This delay difference can be removed in the same transceiver architectures using a bidirectional delay element as shown in FIGS. 3A to 6, for example by applying different delay adjustment controls to the positive and negative paths in the bidirectional delay element.

Figure 3B:
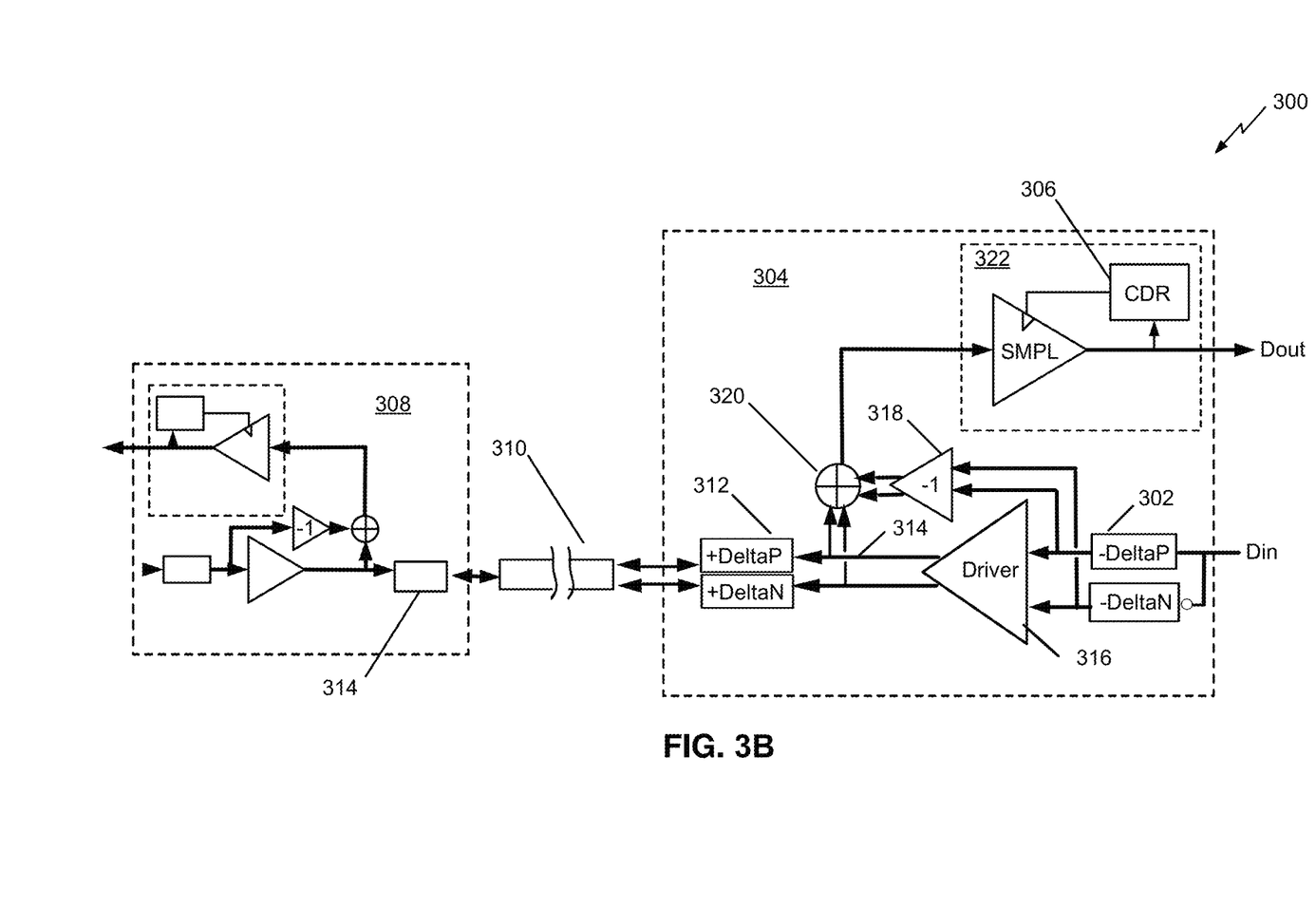
FIG. 3B Illustrates another example implementation of a phase optimizing simultaneous bidirectional link according to various aspects.
Figure 4A:
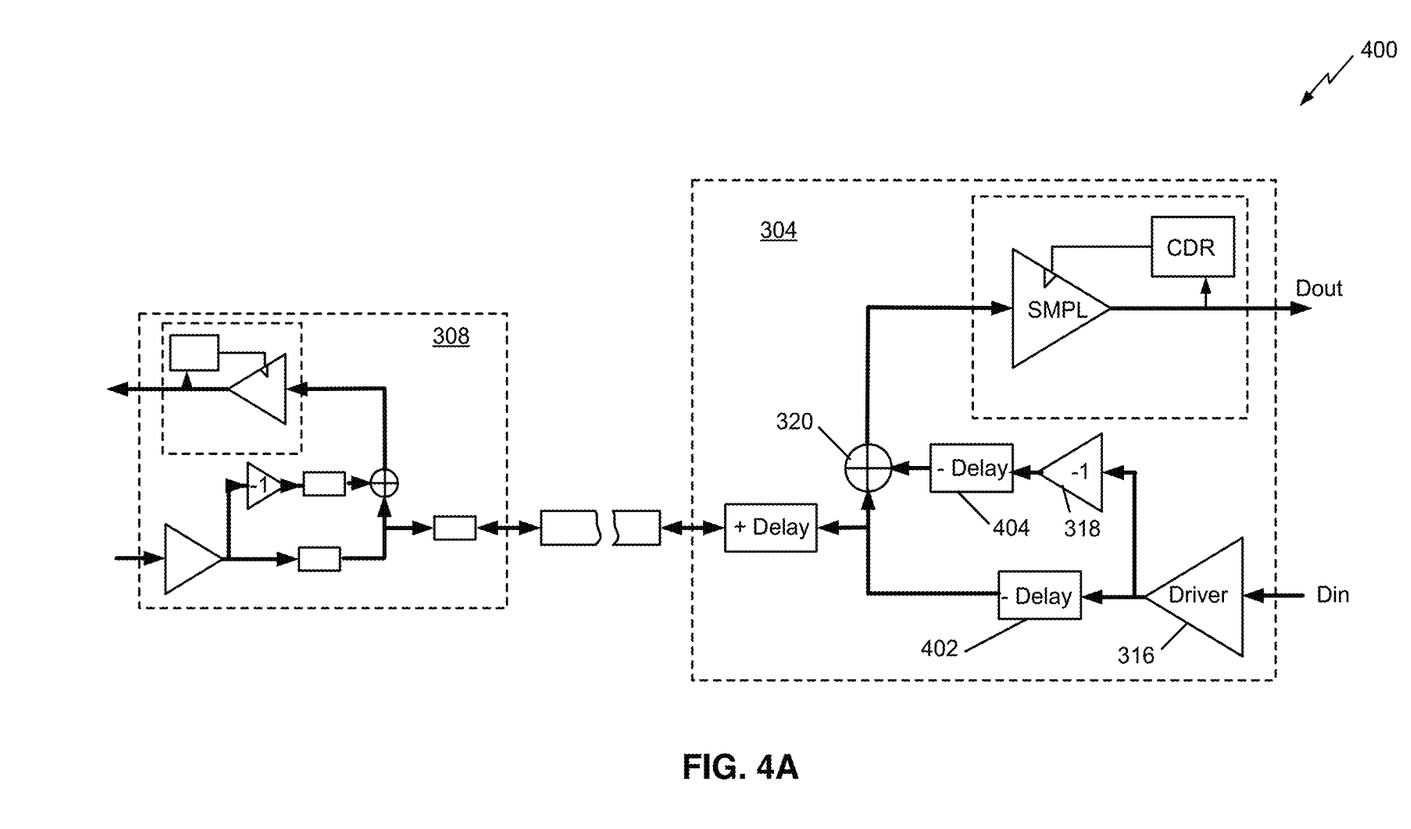
FIG. 4A Illustrates an example alternative implementation of a phase optimizing simultaneous bidirectional link according to various aspects.
Figure 4B:
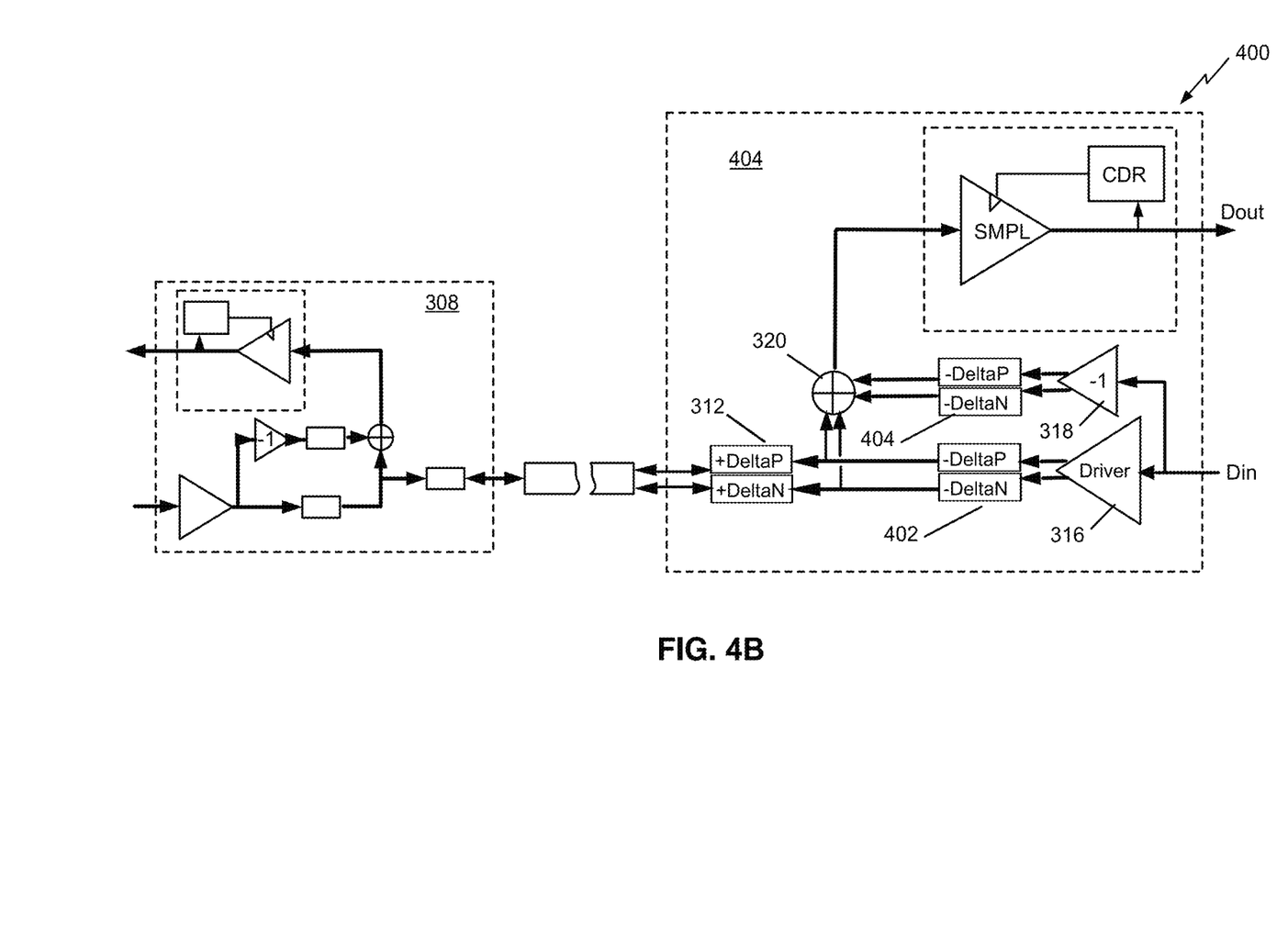
FIG. 4B Illustrates another example alternative implementation of a phase optimizing simultaneous bidirectional link according to various aspects.

To make this concept easier to follow, FIGS. 3B and 4B are shown in differential mode. For example, if one assumes the two positive and negative polarities of the far-end signals are received with a skew delay between them at transceiver 304, where positive signal is ahead of the negative signal by a timing skew of Xt. The bidirectional delay element 312 can be adjusted such that its positive delay path delays the positive signal by Xt more than it delay its negative delay path, such that at the point the two polarities arrive at the summer 320, the skew between the two polarities are substantially cancelled. To avoid this delay skew between the positive and negative paths of bidirectional delay line 312 affect the transmit signal going out, the positive and negative transmit signals should be skewed in opposite direction before bidirectional delay element 312. This opposite differential skew can be applied by applying different delay skews for positive and negative path of delay element 302.

In many applications that transmit driver is inherently differential and one cannot apply the differential delay to the output of the driver, a differential delay element can be added between the transmit driver 316 and the summer 320, as shown in FIG. 4B.

The same or similar mechanism as described above in reference to the relative delay unit 302 can exist in a second, or remote bidirectional transceiver 308 on the other side of the bidirectional channel 310 in order to address the same timing adjustment between its own transmit signal and the received signal from the first bidirectional transceiver 304. However, the transmit timing adjustment in the first bidirectional transceiver 304 on one side of the bidirectional channel 310 leads to a timing change for the received signal by the remote bidirectional transceiver 308 at the other side of the bidirectional channel 310. As a result, the remote bidirectional transceiver 308 needs to shift its optimal receiver sampling phase to track the timing change of the signal received from the bidirectional channel, and additionally shift its transmit timing together with its receiver sampling phase to keep their relative timing the same, such that the transmit transitions at receiver continue to occur in between its receive sampling points. This transmit timing change by the remote bidirectional transceiver 308 leads to the same timing shift in the signal received by first bidirectional transceiver 304, thus negates the original optimum timing adjustment between transmit and received signal, which was set by relative delay unit 302. To address this problem, a timing shift (Delta), opposite in polarity but substantially equal in magnitude to that of the relative delay unit 302, can be added to the bidirectional channel 310. This can be accomplished by arranging a bidirectional delay unit 312 in the first bidirectional transceiver 304, as shown in FIGS. 3A and 3B. Together with the relative delay unit 302, the bidirectional delay unit 312 can provide the required relative delay adjustment between local transmit and received signal, while keeping the net delay change of the transmitted signal into bidirectional channel substantially the same. In this scheme, the effective relative delay change between the transmit and receive timing is the sum of the delay magnitude changes (Delta) applied by the relative delay unit 302 and the new bidirectional delay unit.

Since in a normal operation, the delay change (Delta) in the two delay units (relative delay unit 302 and bidirectional delay unit 312) need to have substantially the same magnitude, the effective relative delay change between transmit and received signals at receiver sampling point is the sum of the delay change of each of the delay units (i.e., 2×Delta). While one bi-directional delay unit is sufficient to address the timing conflict between the transceivers on two sides of the bi-directional channel, the remote bidirectional transceiver 308 can include a similar bi-directional delay unit 312 to provide wider delay adjustment for the link.

Referring to FIGS. 3A and 3B, the relative delay unit 302 is shown arranged preceding the transmitter 316 and transmit replica unit 318. This arrangement can provide alignment of the output of the transmitter 316 to the output of the transmitter replica unit 318 feeding the canceller unit 310. However, as will be shown in reference to FIGS. 4A and 4B, the relative delay unit can serve the same function if it is replaced by one duplicate placed after the transmitter 316 and another duplicate after transmit replica unit 318, as long as it does not affect the receive signal.

FIGS. 4A and 4B show examples where the relative delay is applied after transmitter 316 and transmit replica unit 318, by use of a first relative delay unit 402 at the output of the transmitter 316, and a second relative delay unit 404 after the transmit replica unit 318, but before the canceller unit 320 in the path to the receiver 322.

Figure 5:
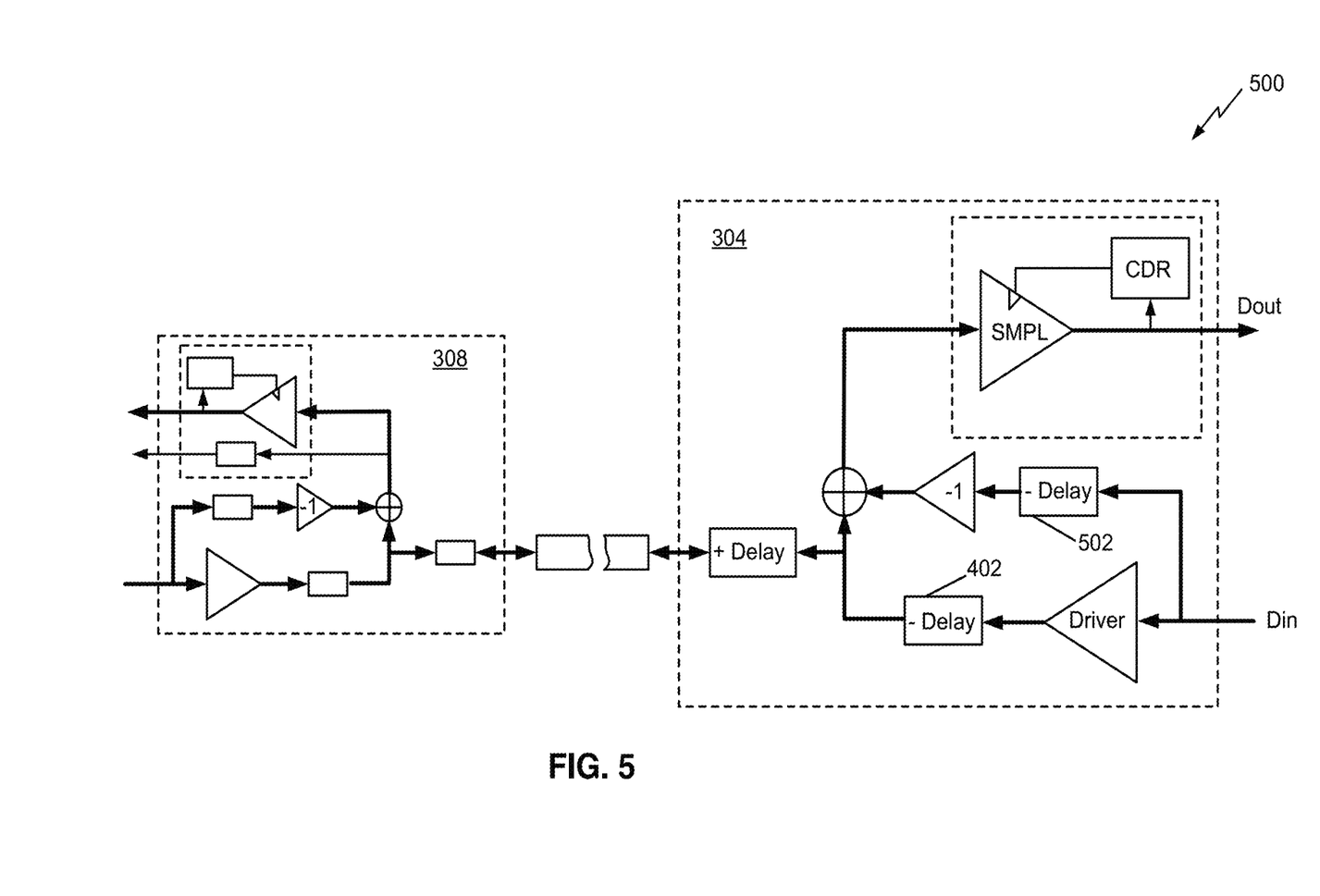
FIG. 5 Illustrates an example of another alternative implementation of a phase optimizing simultaneous bidirectional link according to various aspects.

Another permutation of such architecture is shown in FIG. 5, where the relative delay is still applied after the transmitter 316 by the first relative delay unit 402, but is applied preceding the transmit replica unit 318 using relative delay unit 502.

Figure 6:
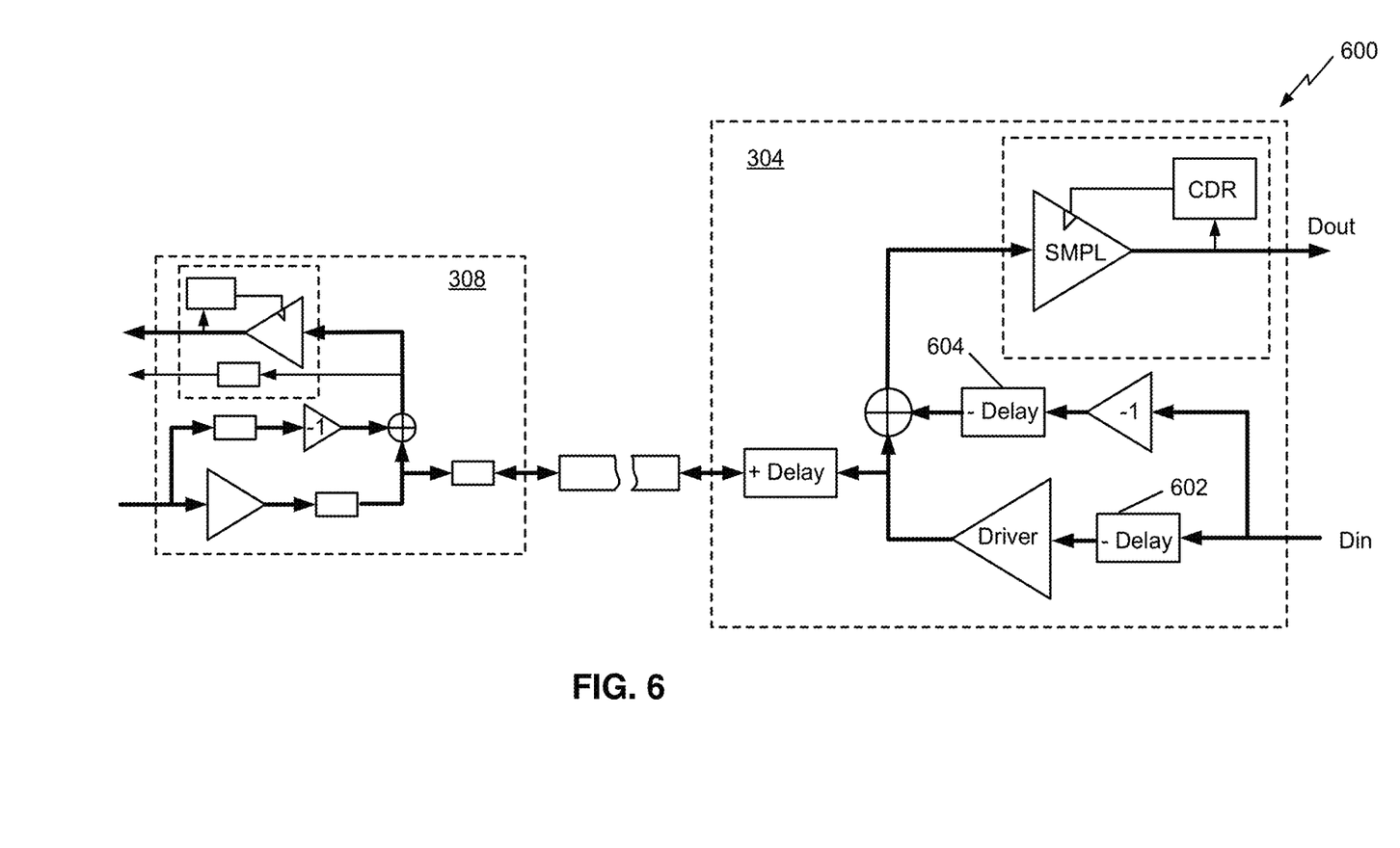
FIG. 6 Illustrates an example of another alternative implementation of a phase optimizing simultaneous bidirectional link according to various aspects.

Another permutation of the same architecture is shown in FIG. 6, where the relative delay is applied preceding the transmitter 316 by the first relative delay unit 602, but is applied after the transmit replica unit 318 using relative delay unit 604.

Referring again to FIGS. 3A and 3B, for purposes of description, a channel coupling the output of the transmitter 316 to one end of the bidirectional delay unit 302 and to an input of the canceller unit 320 can be termed a "local signal channel" (visible, but not separately numbered in the drawings). Also for purposes of description, the transmit replica unit 318 and the canceller unit 320 can be collectively referenced as a "cancellation circuit" (visible, but not separately numbered in the drawings). The cancellation circuit, as can be understood from description herein of operation of its components, can be configured to generate a replica of the delayed driver signal, (e.g., the output of the transmitter 316 in FIGS. 3A and 3B, for example) and to receive a signal from the local signal channel, and further configured to generate a receiver input signal (to the receiver 322) based on subtracting the replica of the delayed driver signal (from the transmit replica unit 318) from the signal received from the local signal channel.

Figure 7:
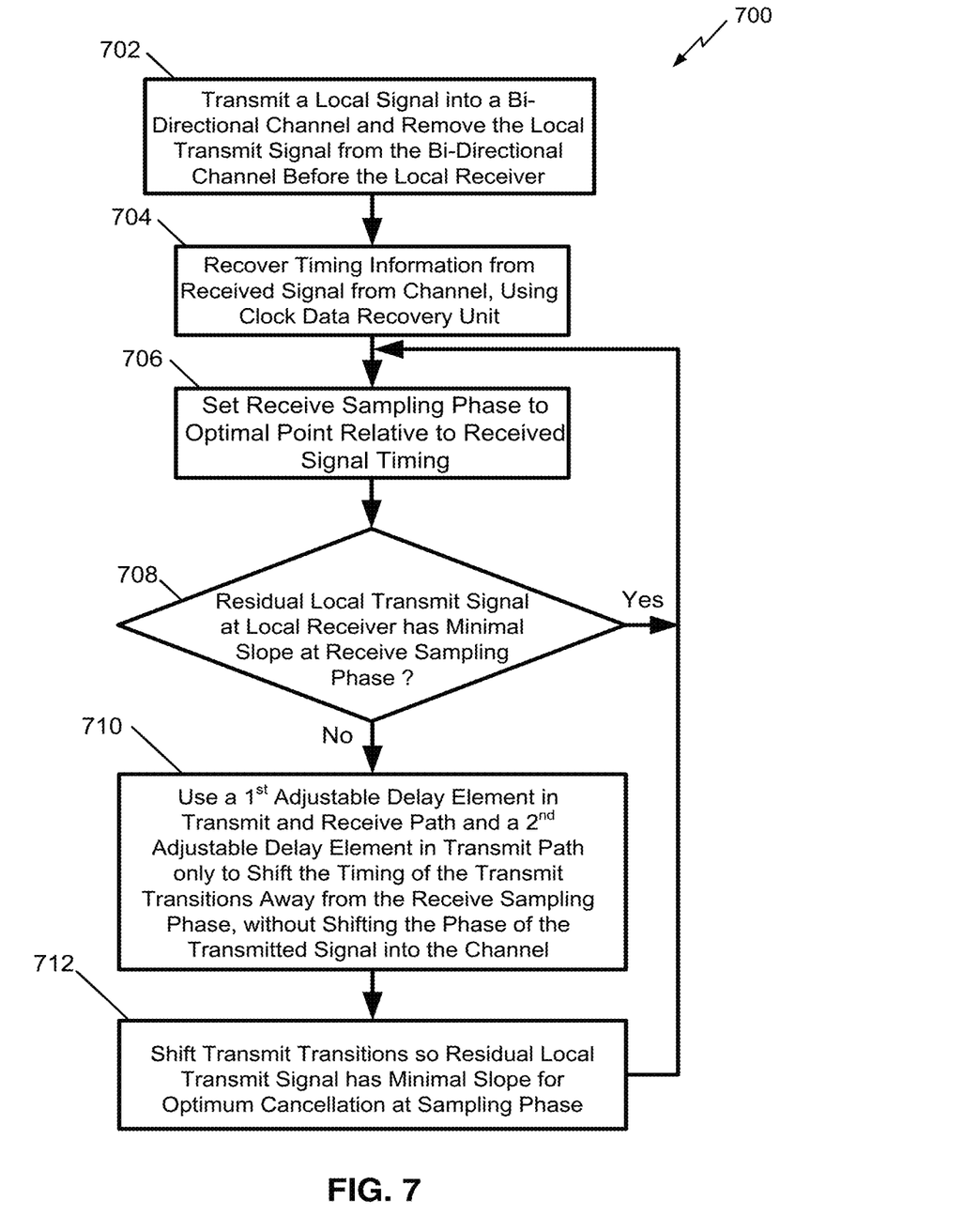
FIG. 7 is a flow diagram of operations to adjust delay elements in an implementation of a phase optimizing simultaneous bidirectional link according to various aspects, to optimize sampling points in accordance with disclosed concepts and aspects thereof.

FIG. 7 illustrates an example flow 700 of operations in a method of timing adjustment between local transmitter transition and receiver sampling for best transmit signal cancellation at receive optimal sampling phase in a simultaneous bidirectional link, using system of FIG. 3A or 3B. Persons of ordinary skill, upon reading this disclosure, can readily apply the flow 700 to equivalent operations using either FIG. 4A, FIG. 4B, FIG. 5, or FIG. 6 system. Referring to FIGS. 3A and 3B, at step 702 transceiver 304 starts transmission of a local signal into the bi-directional channel 310, and the cancellation circuit operates to remove that local transmit signal before being received by the receiver. At steps 704 and 706, transceiver 304 receives the signal from the channel 310 and receiver 322, using CDR unit 306, recovers the best phase to sample the received signal. Once the best sampling point with regards to the received signal is identified, transceiver 304 internally determines if the residual local transmit signal has a minimal slope at the receiver sampling phase. If the answer is "yes," no action is taken and transceiver continues to track the receive signal phase. Otherwise, at step 710, transceiver 304 uses relative delay unit 302 and bidirectional delay unit 312 to shift the timing of the transmit transitions away from the sampling phase at the receiver 322, but without shifting the phase of the transmitted signal into channel 310. The relative timing between transmit and receive is selected, at step 712, such that the residual local transmit signal has a minimal slope at the receive sampling phase. As a result, after the adder or canceller unit 320, receiver sampling occurs at a most stable portion of the local transmit signal with minimal slope, or effectively at the middle of the transmit eye. As discussed earlier, at this point the transmit signal cancellation can be performed most accurately and optimally.

It can be noted by persons of ordinary skill, upon reading this disclosure that, for a known channel with a constant delay, the optimum relative delay setting between transmit and receive timing of a bidirectional transceiver can be identified a priori and hard-coded in the relative delay unit and the bidirectional delay unit in advance. Additionally, in certain implementations that the delay of the bi-directional channel itself can be controlled or its delay can be properly set in advance by design for a target signaling scheme, the bidirectional delay unit can be eliminated from the transceiver.

While this invention has been particularly shown and described with references to preferred embodiments thereof, it will be understood by those skilled in the art that various changes in form and details may be made therein without departing from the scope of the invention encompassed by the appended claims.

What is claimed is:

1. A bi-directional transceiver circuit comprising:
 a differential delay driver circuit, configured to receive a data-in signal and to drive into a differential local signal channel a differential delayed driver signal representing the data-in signal, having positive and negative polarity, and a first time shift for its positive polarity and a second time shift for its negative polarity;
 a bi-directional differential delay element having positive and negative polarities and different time shifts for its positive and negative polarities, configured to couple the local signal channel with an external channel medium;
 a cancellation circuit, configured to generate a replica of the differential delayed driver signal, and to receive signals from the local signal channel, and further configured to generate a receiver input signal based on subtracting the replica of the differential delayed driver signal from the signals received from the local signal channel;
 the bi-directional differential delay element further configured to receive from the external channel medium a differential signal with timing skew between its positive and negative polarities.

2. The bi-directional transceiver circuit of claim 1, wherein the differential delay driver circuit is a settable differential delay driver circuit, further configured to receive first and second delay settings, and wherein the first time shift is adjusted in accordance with the first delay setting and the second time shift is adjusted in accordance with the second delay setting.

3. The bi-directional transceiver circuit of claim 2, wherein the delay settings are delay control signals, and wherein the bi-directional transceiver circuit further comprises:
 a local transmit phase controller, configured to generate the delay control signals based on a timing of transitions in the differential delayed driver signal relative to a sampling phase.

4. The bi-directional transceiver circuit of claim 3, wherein the local transmit phase controller is further configured to adjust the delay control signals to maintain a given optimal phase difference between the timing of transitions in the differential delayed driver signal and the sampling phase.

5. The bi-directional transceiver circuit of claim 4, wherein the given optimal phase difference is where the transmit signal is maximally canceled at the sampling phase.

6. The bi-directional transceiver circuit of claim 3, wherein:
 the settable differential delay driver circuit is configured to change the first time shift by an first Delta, the first Delta being a time shift corresponding to the first delay control signal, and the second time shift by a second Delta, the second Delta being a time shift corresponding to the second delay control signal, and
 the bi-directional differential delay element, configured to provide a bi-directional differential path, having a third time shift between positive polarity of the external channel medium and the positive polarity of local signal channel, and configured to change the third time shift by a third Delta, the third Delta having the same or substantially the same magnitude as a magnitude of the first Delta and a polarity opposite to a polarity of the first Delta, and
 the bi-directional differential delay element further having a fourth time shift between negative polarity of the external channel medium and the negative polarity of the local signal channel, and configured to change the fourth time shift by a fourth Delta, the fourth Delta having the same or substantially the same magnitude as a magnitude of the second Delta and a polarity opposite to a polarity of the second Delta.

7. The bi-directional transceiver circuit of claim 6, wherein:
 the settable differential delay driver circuit includes an input and a differential output, and includes a first adjustable differential delay element, the first adjustable differential delay element configured to provide a differential path, from the driver input, having the first and second time shift, and to receive the first and second delay control signals, and in response, change the first time shift of the driver output positive polarity by the first Delta and the second time shift of the driver output negative polarity by the second Delta, and
 the cancellation circuit includes a differential delay replica driver and a differential adder, the differential delay replica driver having an input coupled to the differential delay driver input, and a differential output, and includes a second adjustable differential delay element, configured to provide a differential path from the driver input, having a fifth time shift for the positive polarity of the replica driver output and a sixth time shift for the negative polarity of the replica driver output, and to receive the first and second delay control signals, and in response, change the fifth time shift by an amount equal to the first Delta and change the sixth time shift by an amount substantially equal to the second Delta, and
 the adder having a first adder input configured to receive signals from the local signal channel, a second adder input configured to receive an output signal from the differential delay replica driver, and an adder output configured to generate the receiver input signal based on subtracting the output signal of the differential delay replica driver from the received signals of the local signal channel.

8. The bi-directional transceiver circuit of claim 7, wherein the bi-directional adjustable delay element is further configured to:
 provide the bi-directional path, having the third and fourth time shift, between the positive and negative polarities of an external differential wireline channel medium and local signal channel,
 receive the delayed differential driver signal from the local signal channel, and transmit into the external differential wireline channel medium a corresponding differential wireline transmit signal, wherein its positive and negative polarities are delayed by the third and fourth time shifts respectively relative to the positive and negative polarities of the delayed differential driver signal, and
 receive a differential wireline signal from the external differential wireline channel medium and deliver, into the local signal channel in superposition with the delayed differential driver signal, a corresponding delayed differential received signal, wherein its positive and negative polarities are delayed by the third and fourth time shifts respectively relative to the received wireless signal.

9. The bi-directional transceiver circuit of claim 6, wherein:
a difference between the third and fourth time shifts in the bi-directional differential delay element is adjusted so the timing skew between the positive and negative polarities of the differential signal received from the external channel medium is substantially zero at the local signal channel.

10. A receiver circuit comprising:
bi-directional differential delay element with a positive polarity signal path having a first time shift and a negative polarity signal path with a second time shift configured to couple a local signal channel to an external differential channel medium;

a subtraction circuit, configured to receive a differential signal from the local signal channel, and further configured to generate a receiver input signal based on subtracting polarities of the differential signal received from the local signal channel.

11. The receiver circuit of claim 9, wherein:
the bi-directional differential delay element is a settable differential delay circuit, further configured to receive a first and second delay settings, and wherein the first time shift is adjusted in accordance with the first delay setting and the second time shift is adjusted in accordance with the second delay setting.

12. The receiver circuit of claim 10, wherein:
The first and second delay settings are adjusted so the timing skew between the positive and negative polarities of the differential signal received from the external channel medium is substantially zero at the local signal channel.

* * * * *

UNITED STATES PATENT AND TRADEMARK OFFICE
CERTIFICATE OF CORRECTION

| | |
|---|---|
| PATENT NO. | : 11,323,181 B2 |
| APPLICATION NO. | : 16/460074 |
| DATED | : May 3, 2022 |
| INVENTOR(S) | : Shahab Ardalan |

It is certified that error appears in the above-identified patent and that said Letters Patent is hereby corrected as shown below:

On the Title Page

Item (73), please remove the Assignee's name "Radin Global".

Signed and Sealed this
First Day of November, 2022

Katherine Kelly Vidal
*Director of the United States Patent and Trademark Office*